United States Patent

[11] 3,542,007

| [72] | Inventor | Floyd M. Minks |
| --- | --- | --- |
| | | Campbellsport, Wisconsin |
| [21] | Appl. No. | 591,790 |
| [22] | Filed | Nov. 3, 1966 |
| [45] | Patented | Nov. 24, 1970 |
| [73] | Assignee | Brunswick Corporation |
| | | Chicago, Illinois |
| | | a corporation of Delaware, by mesne assignment |

[54] ALTERNATOR DRIVEN CAPACITOR DISCHARGE IGNITION SYSTEM
2 Claims, 5 Drawing Figs.

[52] U.S. Cl............................................. 123/148,
123/149; 315/209; 310/70
[51] Int. Cl............................................. F02p 3/06
[50] Field of Search....................... 123/148DC,
148E, 149, 149A, 149B, 149C, 149D,
149E; 315/209T, 209CD; 310/70

[56] References Cited
UNITED STATES PATENTS

| 3,461,851 | 8/1969 | Stephens.................. | 123/149 |
| 3,405,347 | 10/1968 | Swift et al................ | 322/91 |
| 3,367,314 | 2/1968 | Hirosawa et al........... | 123/148 |
| 3,240,198 | 3/1966 | Loudon et al............. | 123/148E |
| 3,324,841 | 6/1967 | Kebbon et al............. | 123/149 |
| 3,326,199 | 6/1967 | McMillen.................. | 123/149 |
| 3,358,665 | 12/1967 | Carmichael et al........ | 123/148E |

*Primary Examiner*—Laurence M. Goodridge
*Attorney*—Andrus, Sceales, Starke & Sawall

ABSTRACT: The present disclosure relates to an ignition system having a capacitor connected across an alternator winding in series with a diode for charging of the capacitor. A discharge circuit includes a silicon controlled rectifier in series with a pulse transformer across the capacitor. The transformer is connected to the spark plugs through a suitable distributor or the like. The gate of the rectifier is connected to the alternator winding such that a firing voltage is established as the alternator output beings the decreasing amplitude portion of the charging half cycle. Alternatively, the winding charges the capacitor during one half cycle of the output and energizes the gate during the opposite half cycle.

Patented Nov. 24, 1970

3,542,007

INVENTOR
FLOYD M. MINKS
BY
Andrus & Starke
Attorneys

ALTERNATOR DRIVEN CAPACITOR DISCHARGE IGNITION SYSTEM

This invention relates to an alternator driven capacitor discharge ignition system for internal combustion engines and the like and particularly to internal combustion engines employed in smaller horsepower outboard motors wherein a battery is not normally employed.

In outboard motor design, the larger engines will normally be provided with an electrical starting system employing a battery and the like. Recent developments have provided capacitor discharge ignition systems having electronic circuitry interconnecting a capacitor to the battery for charging of the capacitor to a suitable firing level and then discharging of the capacitor through a transformer in series with a triggered switch means. The transformer is connected to the spark plugs by a suitable distributor. The capacitor discharge ignition system has substantial advantages from the standpoint of operating outboard motors and the like. However, in the smaller sized engines, an electrical starting system and battery is not normally provided and consequently such capacitor discharge systems have not been widely employed. Although alternator driven capacitor discharging systems have been suggested for internal combustion engines; for example, as shown in U.S. Pat. No. 2,772,320, they have not provided convenient means for firing of the switch means in the discharge circuit.

The present invention is therefore particularly directed to such capacitor discharge ignition system wherein the capacitor is charge directly from the alternator of an outboard motor and periodically discharge through a suitable triggered switch means.

The present invention is particularly directed to an improved means for triggering the switch means.

Generally, in accordance with the present invention, a capacitor is connected across the alternator in series with suitable blocking diode means to prevent discharge of the capacitor through the alternator. The capacitor is also connected in a discharge circuit including a silicon controlled rectifier or other similar triggered switch means for periodic discharge of the capacitor through a transformer which is connected to the spark plugs through a suitable distributor or the like.

The firing circuit can take any one of a plurality of different forms. In one form of the invention, the firing circuit of the triggered switch means is connected to the output of the alternator means in series with the blocking diode such that a firing voltage is established as the alternator output begins the decreasing amplitude portion of the charging half cycle.

In accordance with a particularly satisfactory aspect of the present invention, an alternator means is connected to the charging capacitor to charge the capacitor during one half cycle of the output and is connected through a separate circuit to the triggered switch means to properly fire the switch means during the opposite half cycle. The alternator means may be provided with a firing winding or a completely separate winding energized from the output alternator may be provided and arranged to generate a firing pulse to the switch means only when the alternator output changes from the charging half cycle to the triggering half cycle. For example, a transformer can be connected across the output of an alternator and have an output winding connected across the gate to cathode circuit of a silicon controlled rectifier with a positive polarity applied to the gate electrode during the negative or noncharging half cycle of the alternator output. Alternatively, the alternator may be provided with a separate trigger winding or a separate trigger alternator may be provided.

This invention has been found to provide a very simple and reliable means for firing of the switch means and discharging of the capacitor in an ignition system.

Further, the output of the alternator as noted in the above patent is directly related to the speed of the engine and it is desirable to provide regulation. A convenient method of providing regulation employs a pair of output windings connected in parallel such that the one winding produces the desired output at low speed and the second winding products output at a second speed range. In this manner, relatively constant output can be obtained over a relatively wide speed range.

The drawing furnished herewith illustrates preferred constructions of the present invention in which the above advantages and features are clearly described and shown as well as others which will be clear from the following description.

Figure 1:
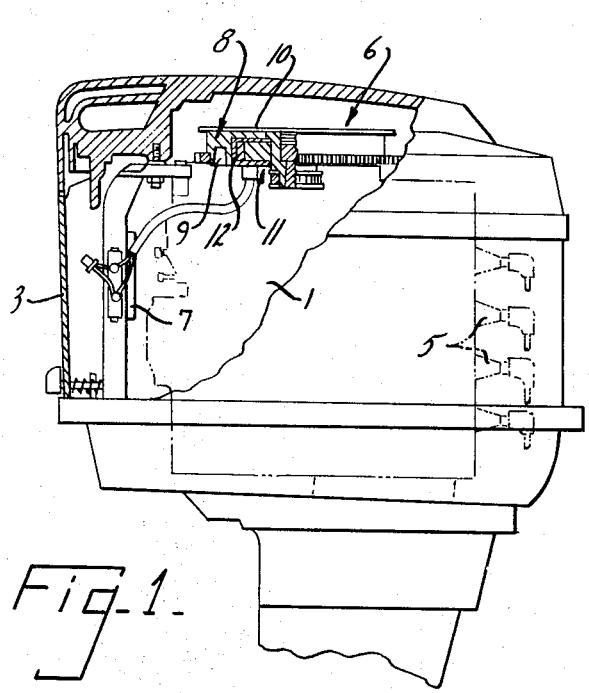
FIG. 1 is a diagrammatic view of an outboard motor having an alternator forming part of a flywheel unit.

Referring to the drawing and particularly to FIG. 1, a portion of an outboard motor is shown having an internal combustion engine 1 mounted on a lower drive shaft unit 2 and enclosed within a suitable protective and decorative housing 3. The engine is of any suitable construction; for example, the usual two-cycle internal combustion engine widely employed in highly satisfactory outboard motor units and connected in any suitable means through a drive mechanism to a propeller, not shown, at the lower end of the unit. The present invention is particularly concerned with the ignition system for the engine 1 and consequently no further detailed description of the engine is given other than necessary to clearly describe the operation of the ignition system and its connection to the spark plugs 5 of the engine.

Generally, in the illustrated embodiment of the invention, an alternator 6 is mounted as a part of the flywheel assembly of the engine 1 and connected to a capacitor discharge ignition unit 7 for firing of the spark plugs 5 of the engine. The alternator 6 can be any suitable permanent magnet type; for example, as shown and more fully described in U.S. Pat. No. 2,856,550. Generally, a permanent magnet rotor 8 is connected to the flywheel assemble assembly. The rotor 8 includes a plurality of circumferentially distributed permanent magnets 9 held within an annular support 10 having the central portion secured to the flywheel assembly. A stator 11 is fixed to the block of engine 1 within the rotor 8 and includes a similar plurality of circumferential windings 12 wound on suitable pole pieces. The windings 12 are connected in series to provide an output in accordance with the speed of rotation. Alternatively, only one magnet and/or one coil could be used, and the coils could be connected in parallel instead of in series.

Figure 2:
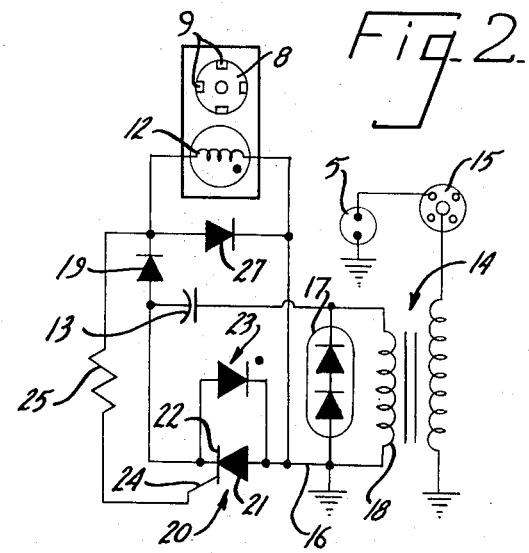
FIG. 2 is a schematic circuit diagram showing the alternator connected as the power source of a capacitor discharge system.

Referring particularly to FIG. 2, the output of the alternator 6 is connected to charge a capacitor 13 forming a part of unit 7. The capacitor 13 is connected to be periodically discharged through a transformer 14 and a distributor 15 to the spark plugs 5. In the illustrated embodiment of the invention, the charging and discharging circuits for the capacitor 13 are similar to the circuit of applicant's copending application entitled Capacitor Ignition System filed on Mar. 1, 1965 with Ser. No. 436,118, now U.S. Pat. No. 3,369,151.

The one side of the alternator winding 12 is connected to a common or ground line 16 which is connected to the one side of the capacitor 13 by a stabistor 17 and by a primary winding 18 of the transformer 14 in parallel. The charging circuit is completed by the connection of the opposite side of the alternator winding to the opposite side of the capacitor 13 in series with a blocking diode 19 which is polarized to conduct when the end of winding 12 connected to the stabistor 17 and winding 18 is positive. Consequently, during the period that the winding has the indicated positive polarity, current flows from the alternator winding 12 through the stabistor 17 and the primary winding 18 to the capacitor 13 and returns to the opposite side of the alternator winding 12 via the diode 19; thereby charging the capacitor 13 The current flow is primarily through the primary winding 18 to provide reset of the core.

The capacitor 13 is connected to be discharged through the primary winding 18 of the transformer 14 by a silicon controlled rectifier 20 which has its anode 21 connected to the ground line 16 and its cathode 22 connected to the negative side of the capacitor 13. A protective diode 23, shown as a Zener diode, is connected in parallel with the silicon controlled rectifier 20 to protect the rectifier from damaging reverse polarity voltages. The silicon controlled rectifier 20 includes the usual gate 24 connected in series with a resistor 25 directly to the side of the alternator winding 12 connected to the cathode of diode 19.

The gate to cathode circuit of rectifier 20 is therefore connected directly across the blocking diode 19 of the charging circuit.

Figure 3:
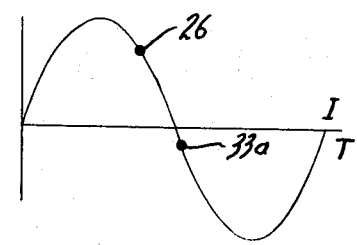
FIG. 3 is a graphical illustration of one cycle of the alternator to more fully describe the operation of the circuit.

Referring particularly to FIG. 3, the one cycle of the alternator output sine wave is shown. The capacitor 13 is charged during the first quarter of the cycle; i.e., during the increasing portion of the positive half cycle. When the output sine wave of the alternator winding 12 passes the peak during the positive or charging half cycle, the voltage across the diode 19 reverses preventing discharge of the capacitor 13 through the alternator winding 12.

A corresponding voltage drop is further established across the gate to cathode circuit in series with the resistor. As a result, the voltage applied across the gate to cathode circuit following the peak voltage during the charging cycle is in the direction to fire the silicon controlled rectifier 20. When the firing level of the trigger rectifier 20 is reached, the rectifier 20 conducts and completes the discharge circuit. As is well known, once fired the rectifier 20 continues to conduct and completely discharge the capacitor 15.

Generally, the firing level is established relatively rapidly and is typically shown at a point 26 on the curve which is a few degrees past the 90° point. Prior to the next charging cycle, the current through the silicon controlled rectifier 20 drops below the holding valve and restores the blocking state. If desired, a diode 27 may be connected across the alternator winding 12 and polarized to conduct the negative half cycle.

The capacitor 13 will therefore be periodically charged and discharged in accordance with the operation of the alternator 6 which in turn is in synchronism with the rotation of the engine. Consequently, the discharge of the capacitor 13 can be directly related to and provide proper sequential firing of the spark plugs 5.

Further, the diode 23 not only protects the silicon controlled rectifier 20 against damaging voltages as in the previously referred to application but may also serve to limit the output of the alternator.

Another construction or system is shown schematically in FIG. 2 wherein the silicon controlled rectifier 20 will be positively fired during the initial portion of each negative half cycle of the output of the alternator.

In FIG. 2, the charging and discharging circuit are essentially identical to that shown in FIG. 1 and consequently no further description thereof is given; corresponding elements being similarly numbered for simplicity of explanation. In FIG. 2, the novel firing circuit for the silicon controlled rectifier 20 is shown and connected directly across the gate to cathode circuit in series with the resistor also shown in FIG. 1, as follows.

An isolating transformer 28 includes a primary winding 29 connected across the output of alternator 6 and a secondary winding 30 connected in series with the resistor 25 across the gate to cathode circuit.

A protective diode 31 in series with a paralleled resistor 32 and capacitor 33 may be inserted in the circuit. Diode 31 prevents possible damaging reverse voltages from being applied across the gate to cathode circuit and the capacitor-resistive network of resistor 32 and capacitor 33 may be desirable to improve formation of a sharp firing pulse. The circuitry of diode 31, resistor 32 and capacitor 33 may also be employed in the circuit of FIG. 2. Further, by proper selection of components, this circuitry may avoid the use of a separate resistor 25.

Figure 4:
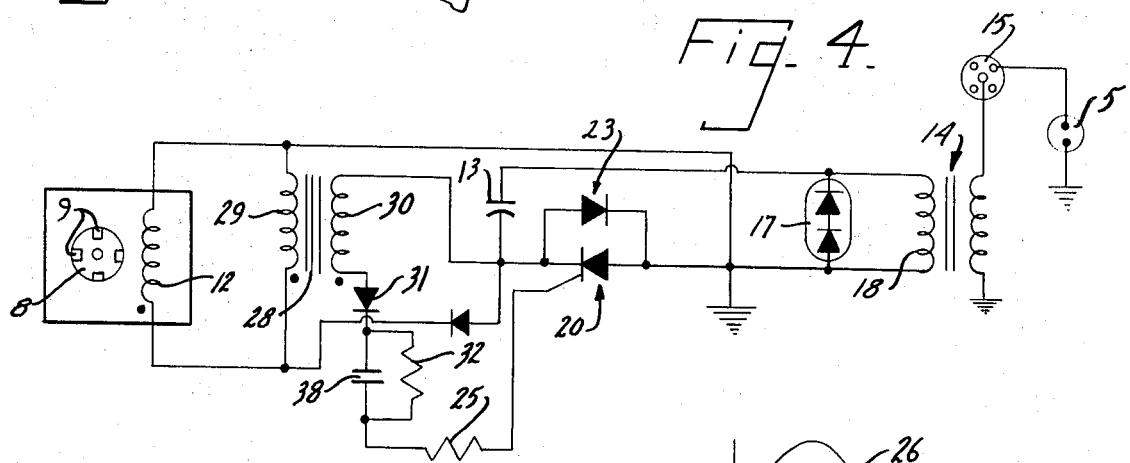
FIG. 4 is a schematic circuit diagram showing an alternative circuit in accordance with the present invention.

The primary and secondary windings 29 and 30 are so wound as to provide the polarity indicated of the alternating current following the charging half cycle. A positive potential is applied to the gate 24. The voltage rises to the firing level shortly after the alternator output reverses from the charging half-cycle and consequently the silicon controlled rectifier 20 will be fired essentially at the same point in each cycle of the alternator output; for example, point 33a in FIG. 3. The system of FIG. 4 provides a closely regulated and stabilized firing of the silicon controlled rectifier 20 and a timing of the discharge of the capacitor.

The output of an alternator is directly related to the speed and consequently an alternator which will provide a highly efficient operation at low speed will generally not provide a highly efficient operation at high speed.

Figure 5:
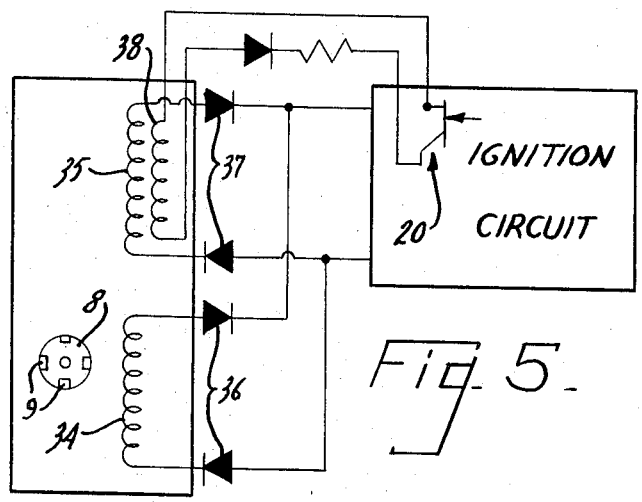
FIG. 5 is a schematic circuit of a dual alternator construction for providing regulation of the output.

Referring particularly to FIG. 5, a dual alternator system is schematically shown having a first alternator winding 34 and a second alternator winding 35 connected in parallel with each other to charge the capacitor 13. Diodes 36 and 37 are connected one each in the parallel branches to prevent circulation of current between the two windings and to charge the capacitor 13 from whichever winding is establishing the higher voltage output. The windings 34 an and 35 are wound to provide different output characteristics with speed. Thus, winding 34 may be wound as a high speed winding and winding 35 as a low speed winding.

The rectifier 20 may be fired to discharge the capacitor in accordance with any of the previously described circuits, or a separate triggering winding 38 may be placed directly on the stator poles and properly wound to provide an output of the proper polarity as schematically shown in FIG. 3. The winding 38 is connected directly across the gate to cathode circuit of the rectifier 20.

The present invention thus provides a simple and inexpensive means for providing improved operation of outboard motors particularly of the small horsepower ratings which are not normally provided with a battery system.

Various modes of carrying out the invention are contemplated as being within the scope of the following claims particularly pointing out and distinctly claiming the subject matter which is regarded as the invention.

I claim:

1. An ignition system for an internal combustion engine having igniting means, and having an alternator mechanically coupled to the engine and having a winding means, and a common magnetic means coupled to said winding means for generating an alternating current output, a capacitor, a charging circuit including said capacitor and having input means for connection to the winding means and unidirectional means for charging the capacitor from said winding means during one-half of each cycle of the alternator, a separate discharging circuit including said capacitor and a triggered switch means having a firing means, and an output means for connection to the igniting means of the engine, and a firing circuit connected to the winding means and to the firing means of the triggered switch means and including means to establish a firing signal conducting path from said winding means to said firing means during the opposite half-cycle of the output of the alternator, said firing circuit including a pulse-forming network and unidirectional conducting means connected to the winding means and to the firing means to conduct the alternate half-cycle of the output of the winding means from that charging the capacitor.

2. The ignition system of claim 1 wherein unidirectional conducting means is a diode means.

UNITED STATES PATENT OFFICE
CERTIFICATE OF CORRECTION

Patent No. 3,542,007    Dated November 24, 1970

Inventor(s)   FLOYD M. MINKS

It is certified that error appears in the above-identified patent and that said Letters Patent are hereby corrected as shown below:

| | | |
|---|---|---|
| ABSTRACT, | Line 9, | cancel "being" and substitute ---begins---; |
| Column 2, | Line 43, | after "flywheel" and before "assembly" cancel "assemble" |
| Column 3, | Line 2, | after the numeral "13" insert a period --- . ---; |
| Column 4, | Line 29, | after the numeral "34" before "and" cancel the word "an"; |
| CLAIM 1 Column 4, | Line 65, | after "a" insert the phrase ---resistance capacitance---. |

Signed and sealed this 30th day of March 1971.

(SEAL)
Attest:

EDWARD M. FLETCHER, JR.
Attesting Officer

WILLIAM E. SCHUYLER, J
Commissioner of Patent